US010349372B2

(12) United States Patent
Lee et al.

(10) Patent No.: US 10,349,372 B2
(45) Date of Patent: Jul. 9, 2019

(54) POSITIONING SYSTEM AND METHOD

(71) Applicant: ELECTRONICS AND TELECOMMUNICATIONS RESEARCH INSTITUTE, Daejeon (KR)

(72) Inventors: Sook Jin Lee, Daejeon (KR); Wanhee Kim, Daejeon (KR); Yong Seouk Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 14 days.

(21) Appl. No.: 15/652,460

(22) Filed: Jul. 18, 2017

(65) Prior Publication Data
US 2018/0027519 A1 Jan. 25, 2018

(30) Foreign Application Priority Data
Jul. 19, 2016 (KR) .......... 10-2016-0091641

(51) Int. Cl.
*H04W 24/00* (2009.01)
*H04W 64/00* (2009.01)
*H04W 16/28* (2009.01)
*H04W 24/08* (2009.01)
*H04W 88/08* (2009.01)

(52) U.S. Cl.
CPC .......... *H04W 64/00* (2013.01); *H04W 16/28* (2013.01); *H04W 24/08* (2013.01); *H04W 88/08* (2013.01)

(58) Field of Classification Search
CPC ........ H04W 24/00; H04W 24/08; H04W 4/02
USPC .............................. 455/456.1, 456.5, 456.6
See application file for complete search history.

(56) References Cited

U.S. PATENT DOCUMENTS

| 2013/0009821 | A1 | 1/2013 | Steer et al. | |
| 2014/0099970 | A1* | 4/2014 | Siomina | G01S 19/49 455/456.1 |
| 2014/0274130 | A1* | 9/2014 | Venkatraman | G01S 5/0009 455/456.2 |
| 2015/0153178 | A1 | 6/2015 | Koo et al. | |
| 2015/0319577 | A1 | 11/2015 | Brunner et al. | |
| 2016/0077185 | A1* | 3/2016 | Marshall | G01S 5/021 455/456.6 |
| 2016/0274215 | A1* | 9/2016 | Edge | G01S 1/66 |

FOREIGN PATENT DOCUMENTS

| KR | 10-1247795 B1 | 3/2013 |
| KR | 10-1402088 B1 | 5/2014 |
| KR | 10-1535873 B1 | 7/2015 |

* cited by examiner

*Primary Examiner* — Temica M Beamer
(74) *Attorney, Agent, or Firm* — LRK Patent Law Firm

(57) ABSTRACT

A method of positioning a terminal includes: receiving a first radio signal generated through beamforming from a base station; obtaining a cell ID and a beam ID from the first radio signal; obtaining a received signal intensity of the first radio signal; and estimating a first position of the terminal by comparing a fingerprint in which a cell ID, a beam ID, and a received signal intensity are mapped to each point on a map with the cell ID, the beam ID, and the received signal intensity obtained from the first radio signal.

17 Claims, 10 Drawing Sheets

POSITIONING SYSTEM AND METHOD

CROSS-REFERENCE TO RELATED APPLICATION

This application claims priority to and the benefit of Korean Patent Application No. 10-2016-0091641, filed in the Korean Intellectual Property Office on Jul. 19, 2016, the entire content of which is incorporated herein by reference.

BACKGROUND

1. Field of the Invention

Exemplary embodiments relate to a positioning system and method.

2. Description of Related Art

Recently, location-based services (LBSs) have emerged as a main mobile service, and positioning technology should be basically secured to provide the location-based services.

A positioning system is classified into an absolute positioning system and a relative positioning system.

The absolute positioning system is a system that tracks an absolute position of a target. A typical absolute positioning system includes a global positioning system (GPS), and a Wi-Fi positioning system (WPS) and the like corresponding to the typical absolute positioning system has been researched.

The relative positioning system is a system that tracks a position change amount relative to an initial position of a target when tracking a position of the target, which is referred to as a dead reckoning system. A typical dead reckoning system includes a pedestrian dead reckoning (PDR) system.

The GPS positions a target by using reception time differences between a plurality of satellite signals received from a satellite. The positioning system using the GPS may not perform the positioning in areas where reception of satellite signals is difficult, such as tunnels, indoor places, and dense areas of tall buildings, or a positioning error may be very large. In addition, since power required for receiving the satellite signals is large, it is difficult to use a portable terminal with a battery for positioning at all times.

The WPS positions a target through an intensity of a signal received from a wireless LAN access point (AP). In the WPS, when signals are not received to from a sufficient number of APs, positioning accuracy may deteriorate.

Since the PDR system measures relative movement with respect to an initial position of a target, it is impossible to recognize an absolute position of the target, and measured errors may be accumulated depending on a movement distance of the target.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a positioning system and method that may improve accuracy of a positioning result.

An exemplary embodiment of the present invention provides a method of positioning a terminal, including: receiving a first radio signal generated through beamforming from a base station; obtaining a cell ID and a beam ID from the first radio signal; obtaining a received signal intensity of the first radio signal; and estimating a first position of the terminal by comparing a fingerprint in which a cell ID, a beam ID, and a received signal intensity are mapped to each point on a map with the cell ID, the beam ID, and the received signal intensity obtained from the first radio signal.

Another exemplary embodiment of the present invention provides a positioning system including: a transceiver configured to receive a first radio signal generated through beamforming from a base station, and a first positioning device configured to estimate a first position of a terminal by comparing a fingerprint in which a cell ID, a beam ID, and a received signal intensity are mapped to each point on a map with a cell ID, a beam ID, and a received signal intensity obtained from the first radio signal.

Another embodiment of the present invention provides a positioning system including: an inertial sensor; a transceiver configured to receive a first radio signal generated through beamforming from a base station or a second radio signal from at least one access point; a first positioning device configured to estimate a position of a terminal by comparing a fingerprint in which a cell ID, a beam ID, and a received signal intensity are mapped to each point on a map with a cell ID, a beam ID, and a received signal intensity obtained from the first radio signal; a second positioning device that estimates the position of the terminal through a received signal intensity or a round trip time obtained from the second radio signal; a third positioning device configured to obtain relative movement information of the terminal with respect to a reference position based on sensing information obtained through the inertial sensor and to obtain the position of the terminal based on the relative movement information of the terminal with respect to the reference position; and a combining portion configured to combine positioning results of at least one of the first positioning device, the second positioning device, and the third positioning device depending on whether each positioning device is available to obtain a final position of the terminal.

DETAILED DESCRIPTION OF THE EMBODIMENTS

Figure 1:
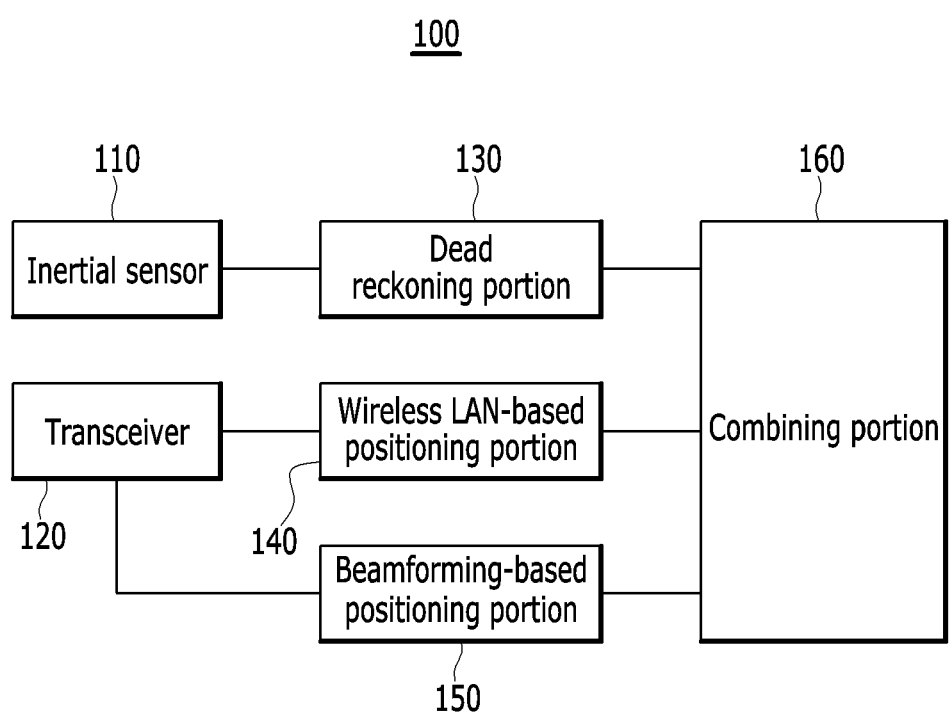
FIG. 1 illustrates a schematic view of a positioning system according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and all the claims, unless explicitly described to the contrary, the word "comprise" and variations such as "comprises" or "comprising" will be understood to imply the inclusion of stated elements but not the exclusion of any other elements.

Throughout the specification and all the claims, a terminal may designate a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and it may include entire or partial functions of the MT, the MS, the AMS, the HR-MS, the SS, the PSS, the AT, or the UE.

Further, a base station (BS) may designate an advanced base station (ABS), a high reliability base station (HR-BS), a nodeB (node B), an evolved node B (eNodeB), an access point (AP), a radio access station (RAS), a base transceiver station (BTS), a mobile multihop relay (MMR)-BS, a relay station (RS) for functioning as the base station, a relay node (RN) for functioning as the base station, an advanced relay station (ARS) for functioning as the base station, a high reliability relay station (HR-RS) for functioning as the base station, or a small base station (such as a femto BS, a home node B (HNB), a home eNodeB (HeNB), a pico BS, a metro BS, or a micro BS), and it may include entire or partial functions of the ABS, nodeB, eNodeB, AP, RAS, BTS, MMR-BS, RS, RN, ARS, HR-RS, and small base station.

Hereinafter, a positioning system and method according to an exemplary embodiment will be described in detail with reference to the accompanying necessary drawings.

Figure 2:
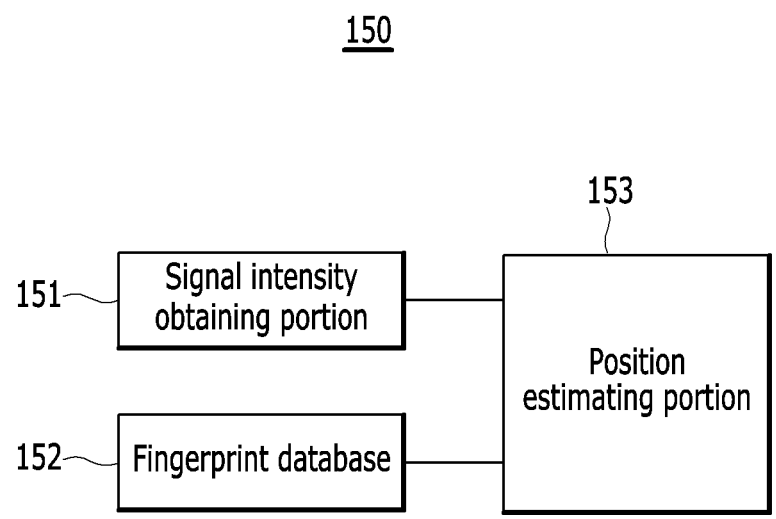
FIG. 2 illustrates a schematic view of a beamforming-based positioning portion according to an exemplary embodiment.

FIG. 1 illustrates a schematic view of a positioning system according to an exemplary embodiment. FIG. 2 illustrates a schematic view of a beamforming-based positioning portion according to an exemplary embodiment.

Referring to FIG. 1, a positioning system 100 according to an exemplary embodiment may include an inertial sensor 110, a transceiver 120, a dead reckoning portion 130, a wireless LAN-based positioning portion 140, a beamforming-based positioning portion 150, and a combining portion 160. The positioning system 100 according to the exemplary embodiment may be included in a terminal.

The inertial sensor 110 detects inertial force according to movement of a target, and provides acceleration, speed, a direction, and a moving distance of the target. The inertial sensor 110 is used to measure relative movement information of a terminal with respect to a reference point corresponding to a specific position. The inertial sensor 110 may include various sensors such as an angular velocity sensor, an acceleration sensor, a geomagnetic sensor, a gyro sensor, etc.

The transceiver 120 receives a radio signal from an access point (AP) or a base station.

The dead reckoning portion 130 may obtain movement information of the terminal based on information obtained by the inertial sensor 110 through pedestrian dead reckoning (PDR).

The dead reckoning portion 130 may estimate heading of the terminal through information obtained by a geomagnetic sensor or a gyro sensor.

The dead reckoning portion 130 may estimate a movement distance of the terminal through information obtained by an acceleration sensor. The dead reckoning portion 130 may acquire the number of steps of a terminal user through the information obtained by the acceleration sensor. Then, the movement distance of the terminal may be estimated by multiplying the number of steps of the terminal user by a stride estimate value.

The dead reckoning portion 130 may estimate a current position of the terminal based on movement information of the terminal (e.g., movement direction information, movement distance information, and the like). The dead reckoning portion 130 may obtain a relative position of the terminal with respect to a predetermined reference position based on the movement information of the terminal. In addition, the dead reckoning portion 130 may estimate the current position of the terminal based on the relative position of the terminal with respect to the reference position. For example, the dead reckoning portion 130 may estimate a position of the terminal moving in a direction corresponding to the movement direction based on the reference position as the current position of the terminal. In this case, the reference position positioning system 100 may be a position of the terminal previously measured by the positioning system 100. For example, the reference position may be a position of the terminal previously outputted from the combining portion 160 of the positioning system 100. Movement information of the terminal commonly used when the current position of the terminal is estimated is generated by accumulating movement directions and movement distances of the terminal from a point of time when the reference position is positioned.

When the current position of the terminal is estimated through the dead reckoning, the dead reckoning portion 130 may generate a probability space reflecting the current position of the terminal. The probability space is formed of a plurality of points that are selected for each grid unit or randomly selected, wherein corresponding position information (or coordinate information) is mapped to each of the plurality of points.

Based on the current position of the terminal estimated through the dead reckoning, the dead reckoning portion 130 may generate the probability space reflecting the current position of the terminal by mapping a probability at which the terminal is positioned to each point in the probability space.

When the probability space corresponding to the positioning result is generated, the dead reckoning portion 130 outputs it to the combining portion 160.

The wireless LAN-based positioning portion 140 may estimate the current position of the terminal based on a radio signal received from the at least one AP through the transceiver 120.

The wireless LAN-based positioning portion 140 may estimate the current position of the terminal by comparing intensity of the radio signal received from each AP with a predetermined fingerprint. The fingerprint used in the wireless LAN-based positioning portion 140 is a map in which the received signal intensity of the radio signal received from each AP is mapped for each point on a grid or a randomly selected map. The wireless LAN-based positioning portion 140 may receive the fingerprint from the AP.

The wireless LAN-based positioning portion 140 may estimate the current position of the terminal through trilateration using the radio signal received from each AP. In this case, the wireless LAN-based positioning portion 140 may measure the received signal intensity or a round trip time of the radio signal received from at least one AP, and may then estimate a distance between each AP and the terminal based on the measurement. In addition, the current position of the terminal may be estimated by performing the trilateration based on the position information of each AP and the distance between each AP and the terminal. The position information of each AP may be received from each AP.

When the current position of the terminal is estimated, the wireless LAN-based positioning portion 140 may generate the probability space reflecting the current position. That is, based on the estimated current position of the terminal, the wireless LAN-based positioning portion 140 may generate the probability space reflecting the current position of the terminal by mapping the probability at which the terminal is positioned to each point in the probability space.

When the probability space corresponding to the positioning result is generated, the wireless LAN-based positioning portion 140 outputs it to the combining portion 160.

The beamforming-based positioning portion 150 may estimate the current position of the terminal based on a radio signal received from the base station through the transceiver 120.

Referring to FIG. 2, the beamforming-based positioning portion 150 may include a signal intensity obtaining portion 151, a fingerprint database 152, and a position estimating portion 153.

The signal intensity obtaining portion 151 may obtain the received signal intensity of the radio signal received from the base station. The radio signal received from the base station is a millimeter wave signal generated through beamforming, and it may include a corresponding cell ID, a beam ID, and the like.

The fingerprint database 152 may include a fingerprint. The fingerprint included in the fingerprint database 152 is a map in which the cell ID, the beam ID, the received signal strength, etc. are mapped to a corresponding point on a grid or a randomly selected map. The fingerprint stored in the fingerprint database 152 may be received from the base station.

The position estimating portion 153 may estimate the current position of the terminal by comparing the cell ID, the beam ID, and the received signal intensity of the radio signal received from the base station with the fingerprint stored in the fingerprint database 152. That is, the position estimating portion 153 detects the cell ID and the beam ID from the radio signal received from the base station, and searches a corresponding area from the fingerprint stored in the fingerprint database 152. The position estimating portion 153 may estimate the current position of the terminal by comparing the signal intensity at each point in the searched area with the received signal intensity of the radio signal received from the base station.

When the current position of the terminal is estimated, the position estimating portion 153 may generate the probability space reflecting the current position. That is, based on the estimated current position of the terminal, the position estimating portion 153 may generate the probability space reflecting the current position of the terminal by mapping the probability at which the terminal is positioned to each point in the probability space.

When the probability space corresponding to the positioning result is generated, the position estimating portion 153 outputs it to the combining portion 160.

Referring again to FIG. 1, the combining portion 160 receives the probability space corresponding to the positioning result from at least one of the dead reckoning portion 130, the wireless LAN-based positioning portion 140, and the beamforming-based positioning portion 150. The combining portion 160 may finally determine the current position of the terminal by combining the received probability spaces.

When the probability spaces generated by respective positioning devices (the dead reckoning portion 130, the wireless LAN-based positioning portion 140, and the beamforming-based positioning portion 150) are combined, the combining portion 160 may exclude one that is unusable due to a surrounding environment. For example, the combining portion 160 may determine that the wireless LAN-based positioning portion 140 is not able to be used when there is no AP adjacent thereto, such that the probability space outputted from the wireless LAN-based positioning portion 140 may be excluded from the combining.

The combining portion 160 may apply different weights depending on the surrounding environment to the probability spaces generated by the respective positioning devices, and may then combine them.

The combining portion 160 may adjust the weight applied to the positioning result of the wireless LAN based positioning portion 140 based on the number of APs adjacent to the terminal. For example, when the terminal receives radio signals from a plurality of the APs, the combining portion 160 may determine that positioning through the wireless LAN-based positioning portion 140 is relatively accurate. Accordingly, the combining portion 160 may assign a relatively high weight to the positioning result through the wireless LAN based positioning portion 140, that is, to the probability space found through the wireless LAN based positioning portion 140. In addition, for example, the combining portion 160 may determine that the positioning through the wireless LAN-based positioning portion 140 is relatively inaccurate when the number of APs positioned around the terminal is very small. Accordingly, the combining portion 160 may assign a relatively low weight to the positioning result through the wireless LAN-based positioning portion 140.

The combining portion 160 may adjust the weight applied to the positioning result of the dead reckoning portion 130 according to the movement distance of the terminal with respect to the reference position. As the movement distance of the terminal increases from the reference position, accuracy of the positioning through the dead reckoning portion 130 decreases due to accumulated errors. Accordingly, as the movement distance of the terminal increases from the reference position, the combining portion 160 may reduce the weight applied to the positioning result of the dead reckoning portion 130.

When the weights corresponding to the respective positioning devices are determined, the combining portion 160 applies corresponding weights to the probability spaces generated by the respective positioning devices. Then, the combining portion 160 combines the probability spaces to which the weights are applied to generate a combined probability space.

The combining portion 160 outputs a final positioning result of the terminal based on the combined probability space. That is, at least one point having a highest probability among points in the combined probability space at which the terminal is positioned is finally determined as the current position of the terminal.

The positioning result in the combining portion 160 may be fed back to the dead reckoning portion 130 to be used as the reference position for obtaining the relative position of the terminal in the dead reckoning portion 130.

In the positioning system 100 having the aforementioned structure, the functions of the dead reckoning portion 130, the wireless LAN-based positioning portion 140, the beamforming-based positioning portion 150, and the combining portion 160 may be performed by a processor which is implemented by at least one central processing unit (CPU), or a chipset, a microprocessor, etc.

Figure 3:
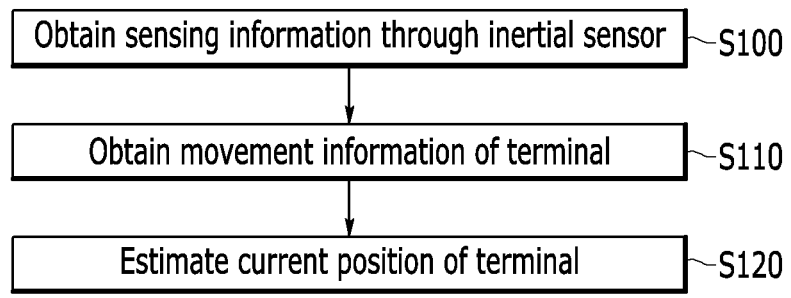
FIG. 3 illustrates a schematic view of a method of positioning a terminal through a dead reckoning positioning method in a positioning system according to an exemplary embodiment.

FIG. 3 illustrates a schematic view of a method of positioning a terminal through a dead reckoning positioning method in a positioning system according to an exemplary embodiment.

Referring to FIG. 3, the positioning system 100 obtains sensing information through the inertial sensor 110 (S100).

In addition, the positioning system 100 obtains the movement information of the terminal including the movement direction and the movement distance of the terminal based on the sensing information obtained at step S100 (S110).

When the movement information of the terminal is obtained, the positioning system 100 may estimate the current position of the terminal by estimating the relative position of the terminal with respect to the reference position corresponding to the previous positioning result in the positioning system 100 based on the obtained movement information of the terminal (S120).

Figure 4:
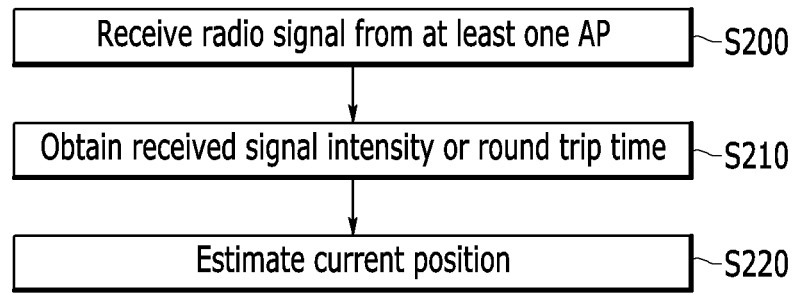
FIG. 4 illustrates a schematic view of a method of positioning a terminal based on a wireless local area network (LAN) in a positioning system according to an exemplary embodiment.
Figure 5:
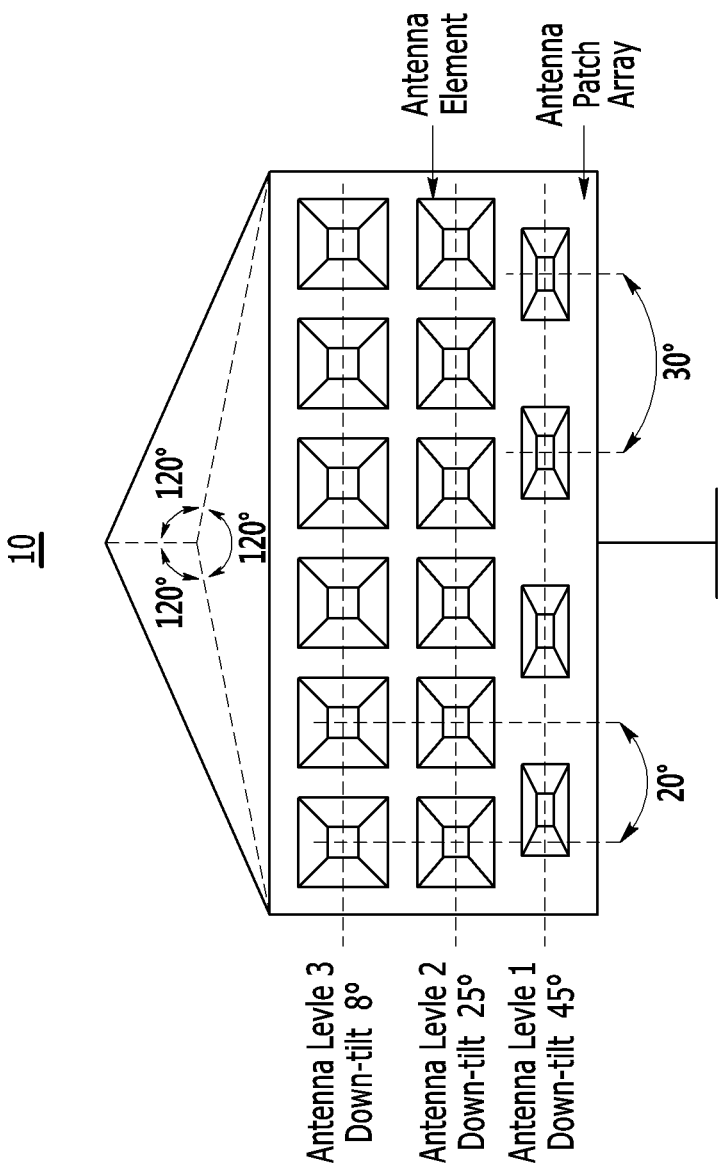
FIG. 5 illustrates an example of a base station antenna structure for beamforming a millimeter wave signal used in a positioning system according to an exemplary embodiment.

FIG. 4 illustrates a schematic view of a method of positioning a terminal based on a wireless local area network (LAN) in a positioning system according to an exemplary embodiment. FIG. 5 illustrates an example of a base station antenna structure for beamforming a millimeter wave signal used in a positioning system according to an exemplary embodiment.

Referring to FIG. 4, the positioning system 100 receives the radio signal from the at least one AP through the transceiver 120 (S200).

In addition, the positioning system 100 obtains the received signal intensity or the round trip time of the radio signal received at step S200 (S210).

When the received signal intensity or the round trip time of the radio signal is received at step S210, the positioning system 100 may estimate the current position of the terminal based on the received signal intensity or the round trip time of the radio signal (S220).

At step S220, the positioning system 100 may estimate the current position of the terminal by comparing the received signal intensity of the radio signal received from each AP with the fingerprint. The fingerprint used herein is a map in which the received signal intensities of the radio signals received from the APs are mapped to respective points on the map.

At step S220, the positioning system 100 may estimate the distance between the terminal and respective APs based on the received signal intensities or the round trip distances of the radio signals received from respective APs. Based on this, the positioning system 100 may also perform trilateration to estimate the current location of the terminal.

Referring to FIG. 5, a base station antenna 10 may have a plurality of down-tilting angles (e.g., 8 degrees, 25 degrees, 45 degrees) and a plurality of horizontal beam widths (e.g., 20 degrees, 24 degrees, 30 degrees) for beamforming a signal in the millimeter wave band. Each beam ID in the base station antenna 10 of this structure is designed to predict a corresponding down-tilting angle and horizontal beam width from the beam ID.

Therefore, as described above, when the beam ID is used to estimate the current position of the terminal the positioning accuracy can be improved.

Figure 6:
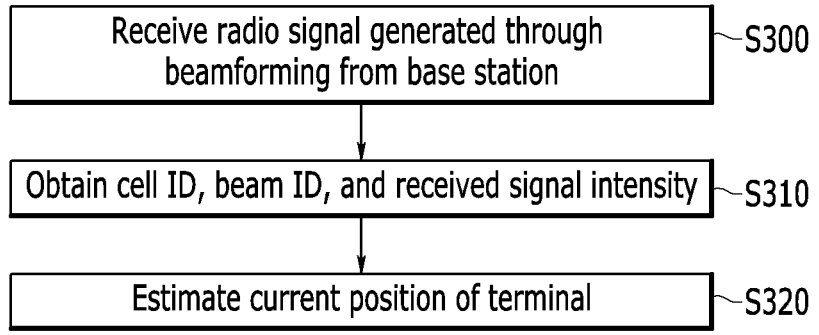
FIG. 6 illustrates a schematic view of a method of positioning a terminal based on beamforming in a positioning system according to an exemplary embodiment.

FIG. 6 illustrates a schematic view of a method of positioning a terminal based on beamforming in a positioning system according to an exemplary embodiment.

Referring to FIG. 6, the positioning system 100 receives the radio signal generated through beamforming from the base station through the transceiver 120 (S300).

In addition, the positioning system 100 obtains the cell ID, the beam ID, and the received signal intensity from the radio signal obtained at step S300 (S310).

The positioning system 100 may estimate the current position of the terminal by comparing the cell ID, the beam ID, and the received signal intensity obtained at step S310 with the fingerprint (S320).

The fingerprint used at step S320 is a map in which the cell ID, the beam ID, the received signal strength, etc. are mapped to a corresponding point on the map.

At step S320, the positioning system 100 searches the fingerprint for an area corresponding to the cell ID and the beam ID obtained at step S310. The positioning system 100 may estimate the current position of the terminal by comparing the signal intensity at each point in the searched area with the received signal intensity of the radio signal received from the base station.

Figure 7:
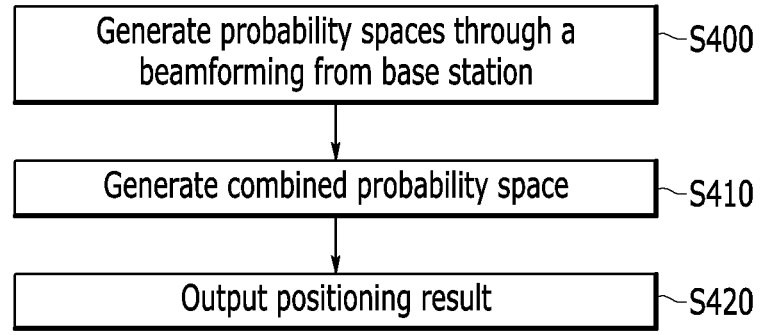
FIG. 7 illustrates a schematic view of a positioning method of combining one or more positioning results in a positioning system according to an exemplary embodiment.

FIG. 7 illustrates a schematic view of a positioning method of combining one or more positioning results in a positioning system according to an exemplary embodiment.

Referring to FIG. 7, the positioning system 100 according to the exemplary embodiment generates probability spaces corresponding to the current position of the terminal through a plurality of positioning devices including a beamforming-based positioning device (S400).

At step S400, the positioning system 100 may estimate the current position of the terminal through the dead reckoning-based positioning method (S100 to S120) described with reference to FIG. 3, and may generate a probability space reflecting the current position.

At step S400, the positioning system 100 may estimate the current position of the terminal through the wireless LAN-based positioning method (S200 to S220) described with reference to FIG. 4, and may generate the probability space reflecting the current position.

At step S400, the positioning system 100 may estimate the current position of the terminal through the beamforming-based positioning method (S300 to S320) described with reference to FIG. 6, and may generate the probability space reflecting the current position.

When the probability spaces are created by respective positioning devices, the positioning system 100 combines the plurality of probability spaces generated by the positioning devices to generate a single combined probability space (S410).

At step S410, the positioning system 100 may exclude a positioning device that is unusable due to a surrounding environment, and may combine only the probability spaces determined by available positioning devices to generate the combined probability space.

At step S410, the positioning system 100 may differently control the weights applied to respective probability spaces of the positioning devices in the combining depending on the surrounding environment.

When the combined probability space is generated, the positioning system 100 finally determines the current position of the terminal based on the combined probability space, and then outputs the positioning result (S420).

According to the exemplary embodiment, the positioning system 100 may obtain the position of the terminal by utilizing only one of the dead reckoning portion 130, the wireless LAN-based positioning portion 140, and the beamforming-based positioning portion 150 as in the positioning methods described with reference to FIG. 3, FIG. 4 and FIG. 6. Alternatively, the positioning system 100 may obtain the position of the terminal by combining the positioning results by two or more positioning devices as in the positioning method described with reference to FIG. 7.

Hereinafter, examples of selectively utilizing one or more positioning devices in the positioning system 100 will be described with reference to FIG. 8 to FIG. 10.

Figure 8:
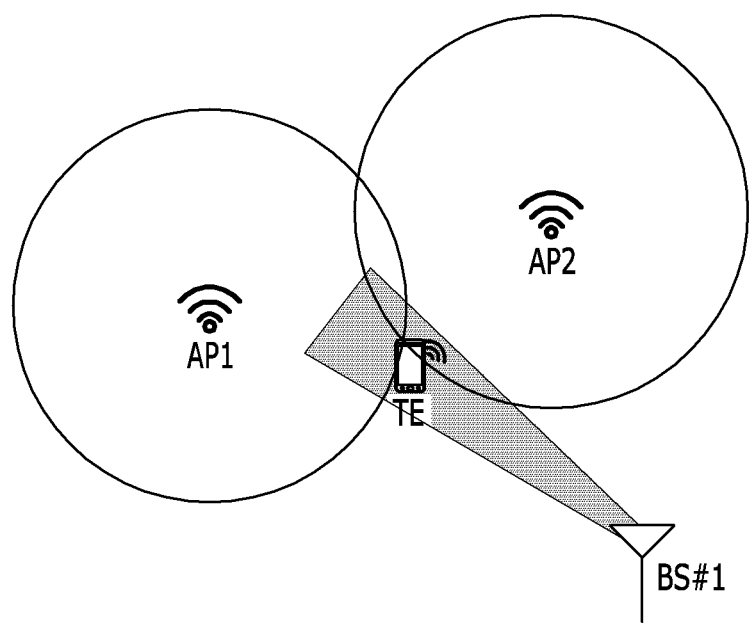
FIG. 8 illustrates an example in which a wireless LAN-based positioning method and a beamforming-based positioning method are combined and used in a positioning system according to an exemplary embodiment.

FIG. 8 illustrates an example in which a wireless LAN-based positioning method and a beamforming-based positioning method are combined and used in a positioning system according to an exemplary embodiment.

Referring to FIG. 8, there are two wireless LAN APs AP1 and AP2 that are positioned adjacent to a terminal TE and are capable of transmitting a radio signal to the terminal TE. It is difficult to specify a position of the terminal to a specific point only by the radio signals received from the two wireless LAN APs AP1 and AP2. Therefore, when the number of adjacent wireless LAN APs is not sufficient, it is possible to improve positioning accuracy by combining the beamforming-based positioning method.

When a beam is generated through millimeter wave signal-based beamforming in a base station BS, a width of the beam is very narrow, thus an area supported by each beam is also very narrow. Therefore, when a relative direction of the terminal TE with respect to the base station BS is estimated based on a beam ID and an intensity of a signal received from the terminal TE, accuracy thereof may be relatively high.

Accordingly, it is possible to improve the positioning accuracy by combining an area in which it is assumed that the terminal exists through the radio signals received from the two wireless LAN APs AP1 and AP2 and an area in which it is assumed that the terminal exists through the beamforming-based positioning method.

Figure 9:
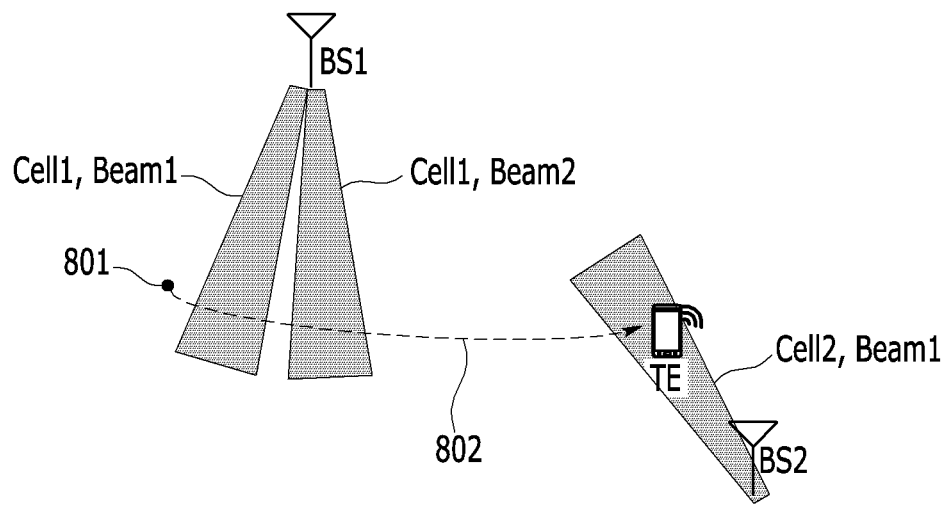
FIG. 9 illustrates an example in which a dead reckoning positioning method and a beamforming-based positioning method are combined and used in a positioning system according to an exemplary embodiment.

FIG. 9 illustrates an example in which a dead reckoning positioning method and a beamforming-based positioning method are combined and used in a positioning system according to an exemplary embodiment.

Referring to FIG. 9, when the dead reckoning is utilized, as a movement distance 802 of the terminal TE from a reference position 801 increases, the positioning accuracy decreases due to accumulated errors. In this case, when the beamforming-based positioning method using one or more beams received from base stations BS1 and BS2 is utilized in combination, since the accumulated errors due to the dead reckoning may be eliminated, it is possible to improve the positioning accuracy.

Figure 10:
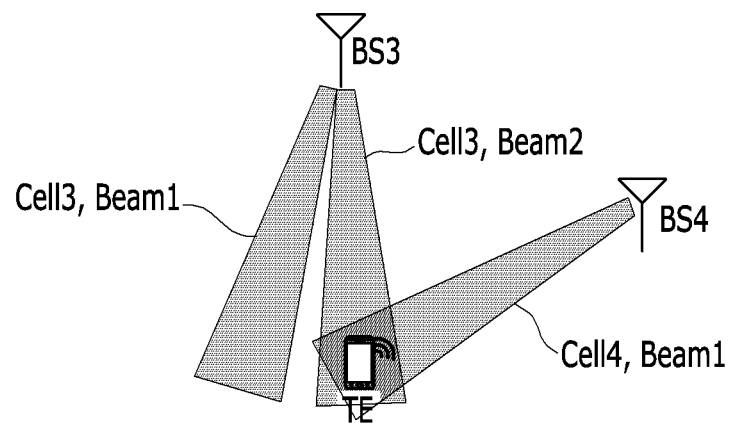
FIG. 10 illustrates an example in which only a beamforming-based positioning method is used to position a terminal in a positioning system according to an exemplary embodiment.

FIG. 10 illustrates an example in which only a beamforming-based positioning method is used to position a terminal in a positioning system according to an exemplary embodiment.

Referring to FIG. 10, when the position of the terminal TE is estimated by using only one beam (Cell4, Beam1) transmitted from one base station BS4, an error of a relative direction of the terminal TE with respect to the base station BS4 due to a narrow beam width thereof is relatively small. In contrast, a distance error between the base station BS4 and the terminal TE is relatively larger than the error of the relative direction.

In this case, when there is another beam (Cell3, Beam2) that may be received by the terminal TE, since relatively accurate positioning may be realized by reducing a range of the error, it is possible to replace the positioning using the GPS.

As described above, the positioning system 100 according to the exemplary embodiment may improve the positioning accuracy of the wireless LAN-based positioning method or the dead reckoning-based positioning method by combining the result of the wireless LAN-based positioning or the dead reckoning-based positioning and the result of the beamforming-based positioning. It is possible to utilize the result of the beamforming-based positioning in a situation in which the wireless LAN-based positioning is difficult or incomplete or the errors due to the dead reckoning are accumulated, thereby improving the positioning availability.

In addition, it is possible to replace the GPS-based positioning method that requires a lot of electric power with the beamforming-based positioning method, thereby minimizing power consumption due to use of the GPS.

According to the embodiment of the present invention, it is possible to improve positioning accuracy by utilizing a beam ID to position a terminal. In addition, even in a situation in which the positioning is difficult or accuracy of the positioning is low, it is possible to improve positioning availability by utilizing the positioning method of using the beam ID, and it is possible to minimize power consumption of a terminal by minimally using a GPS with high power consumption.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of positioning a terminal, comprising:
   receiving a first radio signal generated through beamforming from an antenna of a base station, the antenna having a plurality of down-tilting angles and a plurality of horizontal beam widths for beamforming the first radio signal;
   obtaining a cell ID and a beam ID from the first radio signal, the beam ID being designed in such a manner that a corresponding one of the down-tilting angles and a corresponding one of the horizontal beam widths are predicted from the beam ID;
obtaining a received signal intensity of the first radio signal; and
estimating a first position of the terminal by comparing a fingerprint in which a cell ID, a beam ID, and a received signal intensity are mapped to each point on a map with the cell ID, the beam ID, and the received signal intensity obtained from the first radio signal.

2. The positioning method of claim 1, further comprising:
receiving a second radio signal from at least one access point;
obtaining a received signal intensity or a round trip time of the second radio signal;
estimating a second position of the terminal through the received signal intensity or the round trip time of the second radio signal; and
obtaining a final position of the terminal by combining the first position and the second position.

3. The positioning method of claim 2, wherein the obtaining of the final position includes:
generating a first probability space including a probability that the terminal is positioned at each point based on the first position,
generating a second probability space including a probability that the terminal is positioned at each point based on the second position,
generating a combined probability space by combining the first probability space and the second probability space, and
obtaining the final position of the terminal based on the combined probability space.

4. The positioning method of claim 3, wherein the generating of the combined probability space includes applying different weights to the first probability space and the second probability space and combining them.

5. The positioning method of claim 1, further comprising:
obtaining sensing information through an inertial sensor;
obtaining relative movement information of the terminal with respect to a reference position based on the sensing information;
obtaining a third position of the terminal based on the relative movement information of the terminal with respect to the reference position; and
obtaining the final position of the terminal by combining the first position and the third position,
wherein the reference position is a position where the terminal has been previously positioned.

6. The positioning method of claim 5, wherein the obtaining of the final position includes:
generating a first probability space including a probability that the terminal is positioned at each point based on the first position,
generating a third probability space including a probability that the terminal is positioned at each point based on the third position,
generating a combined probability space by combining the first probability space and the third probability space, and
obtaining the final position of the terminal based on the combined probability space.

7. The positioning method of claim 6, wherein the generating of the combined probability space includes applying different weights to the first probability space and the third probability space and combining them.

8. The positioning method of claim 1, wherein the first radio signal is a millimeter wave signal.

9. A positioning system comprising:
a transceiver configured to receive a first radio signal generated through beamforming from an antenna of a base station, the antenna having a plurality of down-tilting angles and a plurality of horizontal beam widths for beamforming the first radio signal; and
a first positioning device configured to estimate a first position of a terminal by comparing a fingerprint in which a cell ID, a beam ID, and a received signal intensity are mapped to each point on a map with a cell ID, a beam ID, and a received signal intensity obtained from the first radio signal,
wherein the beam ID is designed in such a manner that a corresponding one of the down-tilting angles and a corresponding one of the horizontal beam widths are predicted from the beam ID.

10. The positioning system of claim 9, wherein:
the transceiver receives a second radio signal from at least one access point, and
the positioning system further includes:
a second positioning device that estimates a second position of the terminal through a received signal intensity or a round trip time obtained from the second radio signal; and
a combining portion that combines the first position and the second position to obtain a final position of the terminal.

11. The positioning system of claim 10, wherein:
the first positioning device generates a first probability space including a probability that the terminal is positioned at the each point based on the first position,
the second positioning device generates a second probability space including a probability that the terminal is positioned at each point based on the second position, and
the combining portion combines the first probability space and the second probability space to generate a combined probability space and obtains the final position of the terminal based on the combined probability space.

12. The positioning system of claim 9, further comprising:
an inertial sensor; and
a third positioning device configured to obtain relative movement information of the terminal with respect to a reference position based on sensing information obtained through the inertial sensor and to obtain a third position of the terminal based on the relative movement information of the terminal with respect to the reference position,
wherein the combining portion combines the first position and the third position to obtain the final position of the terminal, and the reference position is a position previously obtained by the combining portion.

13. The positioning system of claim 12, wherein:
the first positioning device generates a first probability space including a probability that the terminal is positioned at each point based on the first position,
the third positioning device generates a third probability space including a probability that the terminal is positioned at each point based on the third position, and
the combining portion combines the first probability space and the third probability space to generate a combined probability space and obtains the final position of the terminal based on the combined probability space.

14. The positioning system of claim 9, wherein the first radio signal is a millimeter wave signal.

15. A positioning system comprising:
an inertial sensor;
a transceiver configured to receive a first radio signal generated through beamforming from an antenna of a base station or a second radio signal from at least one access point, the antenna having a plurality of down-tilting angles and a plurality of horizontal beam widths for beamforming the first radio signal;
a first positioning device configured to estimate a position of a terminal by comparing a fingerprint in which a cell ID, a beam ID, and a received signal intensity are mapped to each point on a map with a cell ID, a beam ID, and a received signal intensity obtained from the first radio signal, wherein the beam ID is designed in such a manner that a corresponding one of the down-tilting angles and a corresponding one of the horizontal beam widths are predicted from the beam ID;
a second positioning device that estimates the position of the terminal through a received signal intensity or a round trip time obtained from the second radio signal;
a third positioning device configured to obtain relative movement information of the terminal with respect to a reference position based on sensing information obtained through the inertial sensor and to obtain the position of the terminal based on the relative movement information of the terminal with respect to the reference position; and
a combining portion configured to combine positioning results of at least one of the first positioning device, the second positioning device, and the third positioning device depending on whether each positioning device is available to obtain a final position of the terminal.

16. The positioning system of claim 15, wherein the reference position is a final position of the terminal previously obtained by the combining portion.

17. The positioning system of claim 15, wherein the combining portion applies different weights to the positioning results of the first positioning device, the second positioning device, and the third positioning device, combines them, and then obtains the final position of the terminal.

* * * * *